(12) United States Patent
Ventura et al.

(10) Patent No.: US 8,784,063 B2
(45) Date of Patent: Jul. 22, 2014

(54) SPLIT BLADE RETENTION RACE WITH INNER AND OUTER CHAMFERS

(75) Inventors: Peter Ventura, Enfield, CT (US); Matthew Soule, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 704 days.

(21) Appl. No.: 13/102,845

(22) Filed: May 6, 2011

(65) Prior Publication Data

US 2012/0282102 A1 Nov. 8, 2012

(51) Int. Cl.
*B64C 11/06* (2006.01)

(52) U.S. Cl.
USPC ........................................ 416/205; 416/244 A (58) Field of Classification Search
USPC .......... 384/499, 501, 505, 506, 570; 416/205, 416/214 A, 214 R, 129
See application file for complete search history.

(56) References Cited

U.S. PATENT DOCUMENTS

| 1,783,791 | A | 12/1930 | Hughes |
| 2,460,910 | A | 2/1949 | Sheets et al. |
| 2,704,129 | A * | 3/1955 | Cushman ...................... 416/205 |
| 4,141,664 | A | 2/1979 | Moran et al. |
| 4,850,801 | A | 7/1989 | Valentine |
| 5,118,256 | A | 6/1992 | Violette et al. |
| 7,845,910 | B2 | 12/2010 | Talasco et al. |
| 2007/0041839 | A1 | 2/2007 | Carvalho |
| 2009/0220344 | A1 | 9/2009 | Pfeiffer et al. |

FOREIGN PATENT DOCUMENTS

| DE | 4315080 A1 | 11/1994 |
| GB | 204864 A | 10/1923 |

OTHER PUBLICATIONS

CA Application No. 2,775,861; Canadian Office Action dated Jul. 10, 2013; 3 pages.
European Search Report dated Jul. 31, 2012; Applicatin No. 12166092.2-2422; Applicant: Hamilton Sundstrand Corporation; pp. 1-26.

* cited by examiner

*Primary Examiner* — Richard Edgar
(74) *Attorney, Agent, or Firm* — Cantor Colburn LLP (57) ABSTRACT

A blade shank assembly for an aircraft propeller blade includes a blade shank; a split blade retention race encircling the blade shank, the split blade retention race including two splits, wherein the split blade retention race comprises: inner chamfers located between the blade shank and the split blade retention race at each of the two splits; and outer chamfers located adjacent to a race surface of the split blade retention race at each of the two splits; and a plurality of ball bearings located on the race surface of the split blade retention race.

13 Claims, 7 Drawing Sheets

SPLIT BLADE RETENTION RACE WITH INNER AND OUTER CHAMFERS

FIELD OF INVENTION

The subject matter disclosed herein relates generally to the field of a split blade retention race for an aircraft propeller blade.

DESCRIPTION OF RELATED ART

A propeller for use in an aircraft includes a central rotating hub having a plurality of blade receiving sockets disposed about the hub. The propeller blades each have a shank located at the base of each propeller blade, and each shank is disposed in a respective blade receiving socket. The blade receiving sockets and the blade shanks are provided with opposed, separated ball bearing race surfaces, and a plurality of ball bearings are held between the blade receiving socket and the blade shank on the race surfaces, allowing adjustment of the pitch of the blade. The ball bearing race on the blade shank may be a separate component, referred to as a blade retention race, that encircles the blade shank. Currently, the blades are shipped with a one piece blade race.

Due to the movement and loading of the ball bearings on the race surface, and resulting damage that occurs to the race, one piece races may be replaced by split races at overhaul. Such a multisection blade retention race may be referred to as a split blade retention race. Once the one-piece race is replaced by split races, the movement and loading of the ball bearings on the edges of the split races has a tendency to damage the blade shank beyond repair.

BRIEF SUMMARY

According to one aspect of the invention, a blade shank assembly for an aircraft propeller blade includes a blade shank; a split blade retention race encircling the blade shank, the split blade retention race including two splits, wherein the split blade retention race comprises: inner chamfers located between the blade shank and the split blade retention race at each of the two splits; and outer chamfers located adjacent to a race surface of the split blade retention race at each of the two splits; and a plurality of ball bearings located on the race surface of the split blade retention race.

According to another aspect of the invention, a split blade retention race for a blade shank assembly for an aircraft propeller blade includes a race surface, the race surface configured to hold a plurality of ball bearings; a split surface, the split surface being configured to be located inside of split separating a first section of the split blade retention race from a second section of the split blade retention race; an inner surface, the inner surface being configured to be located adjacent to a blade shank in the blade shank assembly; an inner chamfer, wherein the inner chamfer is angled back along an interface between the split surface to the inner surface; and an outer chamfer, wherein the outer chamfer is angled back along an interface between the split surface and the race surface.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a split blade retention race with inner and outer chamfers are provided, with exemplary embodiments being discussed below in detail. Current split blade races may have a limited lifespan due to the load from the ball bearings that are held in the race loading the split blade retention race and the geometry of the race at the split. Inclusion of chamfers (defined as a straight beveled edge connecting two surfaces) at the split on both the inner surface of the split blade retention race (adjacent to the blade shank) and the outer surface of the split blade retention race (adjacent to the race surface that holds the ball bearings) prevents the ball bearings from loading the unsupported portion at the edge of the split blade retention race at the split. A radius connecting the chamfer to the adjacent surface provides a smooth race transition for the ball bearings over the split to prevent damage to the blade shank. This extends the life of the split blade retention race, and reduces the number of propeller blades that need to be scrapped due to damage to the blade shank. As noted above, the chamfers further include associated radii, which are curved surfaces that blend the chamfers to adjacent surfaces on the split blade retention race. The radii provide a smooth transition between the chamfers and the adjacent surfaces.

Figure 1:
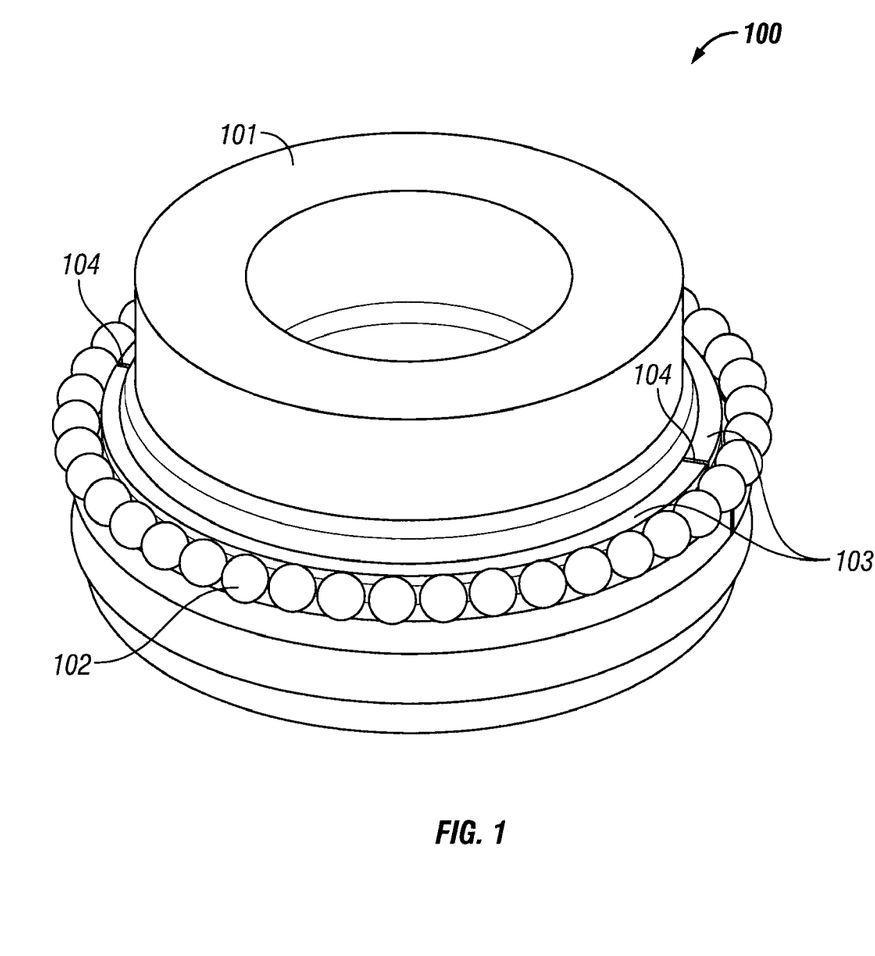
FIG. 1 illustrates an embodiment of a blade shank assembly for an aircraft propeller blade including a split blade retention race.

FIG. 1 shows an embodiment of a blade shank assembly 100 for insertion into a blade receiving socket (not shown) of an aircraft propeller. The blade shank assembly 100 includes blade shank 101, ball bearings 102, and split blade retention races 103. Splits 104 are located between sections of split blade retention race 103. The edges of split blade race 103 at the splits 104 each include a chamfer on the internal side, adjacent to the shank 101, and on the external side, adjacent to the race surface of the split blade retention races 103 on which ball bearings 102 are located. The proportions of the internal and external chamfers ensure that the race is not loaded over the unsupported portion at the edges of the inner split blade retention races 103. The internal and external radii provide a smooth transition by ball bearings 102 between the chamfers and the adjacent race surfaces on the split blade retention race 103 in order to prevent damage to the blade shank 101 as the ball bearings 102 pass over the splits 104. This helps to reduce damage to the split blade retention race 103 and the blade shank 101 from the ball bearings as they pass over the splits 104. The width of the splits 104 are a resultant of the manufacturing process. The split blade retention race 103 is manufactured as a complete ring and then cut in half to form splits 104. Manufacturing the split blade retention race 103 as a complete ring before splitting ensures that the race curvatures of both halves of the split blade retention race 103 are identical.

Figure 2:
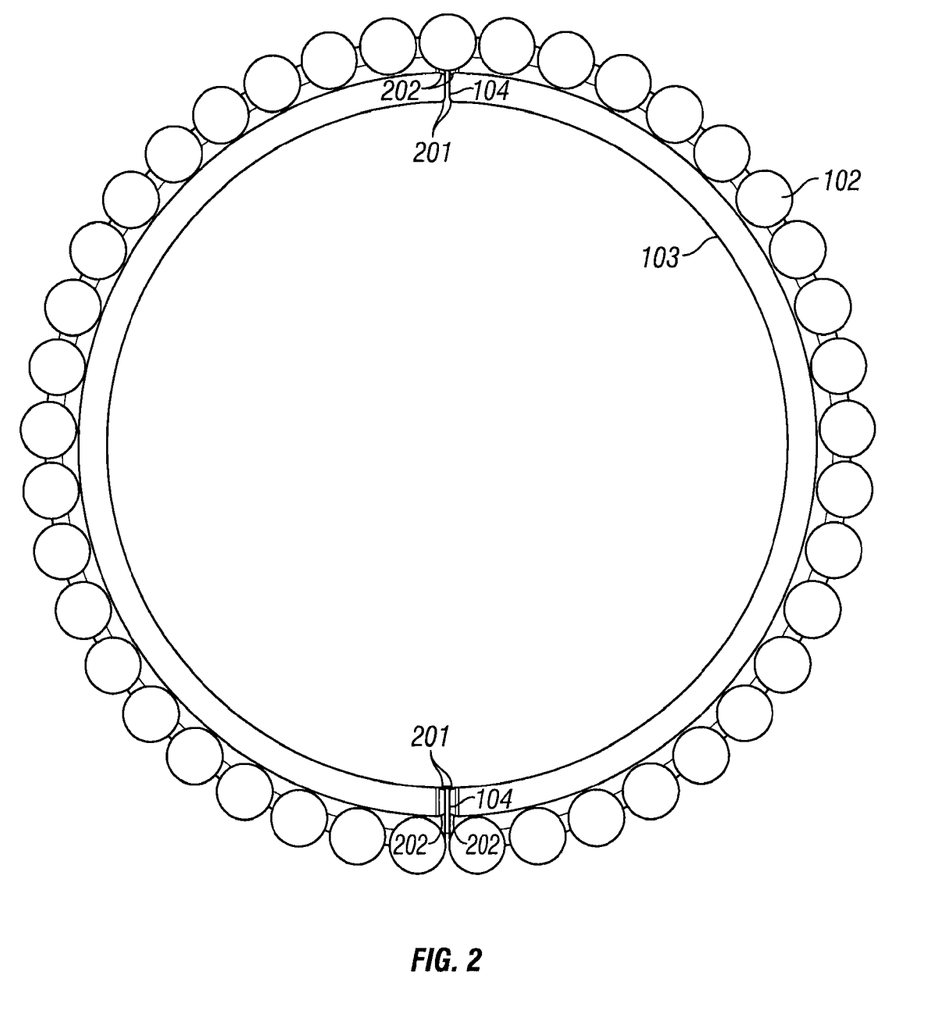
FIG. 2 illustrates a top view of an embodiment of a split blade retention race.

FIG. 2 shows a top view of the split blade retention race 103 of FIG. 1. The ball bearings 102 move on the race surface of split blade retention race 103, and pass over splits 104. Splits 104 are located between the sections of split blade retention race 103. The split blade retention race 103 includes inner chamfers 201, at the edge of the each of the splits 104 on the inner surface of the split blade retention race 103 that is placed adjacent to blade shank 101. The split blade retention race 103 also includes outer chamfers 202, located at the edge of the splits 104 on the race surface of the split blade retention race 103 adjacent to the ball bearings 102. The outer chamfers 202 prevent loading from the ball bearings 102 from being transferred to the unsupported section of the split blade retention race 103. Therefore, a ball bearing that is located on a portion of the radius or chamfer where the distance below the race surface equals the compressive deflection of the ball on the race is fully unloaded. The split configuration of the split blade retention race 103 is such that only one ball bearing of ball bearings 102 is unloaded at any given time; the rest of the ball bearings 102 share the load. This helps to minimize the amount of load carried by each ball.

Figure 3:
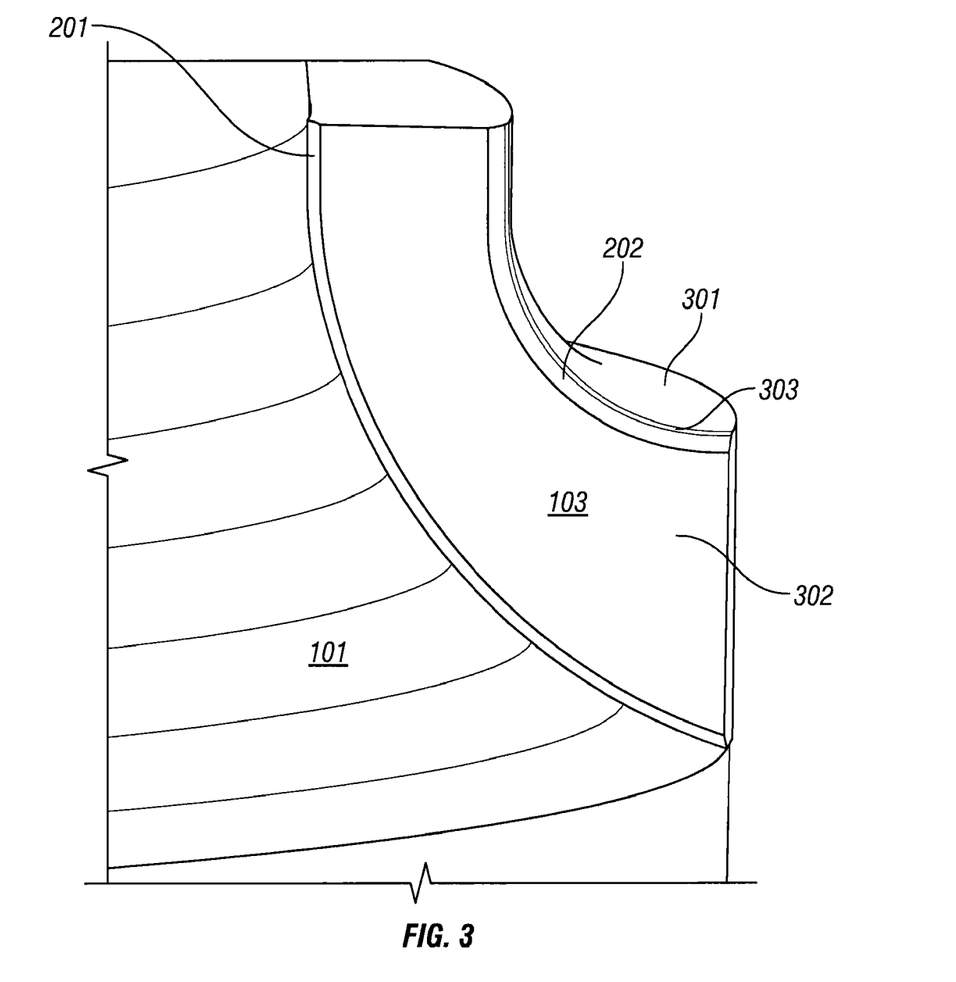
FIG. 3 illustrates a side view of an embodiment of a blade shank with a split blade retention race at a split.

FIG. 3 shows a side view of a blade shank 101 and a split blade retention race 103 at a split 104. Race surface 301 is the surface on which the ball bearings 102 are held. Split surface 302 of split blade retention race 103 is located inside a split 104 directly facing a corresponding split surface on another section of the split blade retention race 103 on the other side of the split 104. Inner chamfer 201 is angled back from split surface 302 to an inner surface of split blade retention race that is adjacent to the blade shank 101. A curved inner radius (discussed in further detail with respect to FIG. 6) is associated with inner chamfer 201 to provide a smooth blend between the inner chamfer 201 and the surface of the split blade retention race 103 that is adjacent to blade shank 101. Outer chamfer 202 is angled back from split surface 302 to race surface 301 such that there is a dip in the race that holds the ball bearings adjacent to the split 104. A curved outer radius 303 (discussed in further detail with respect to FIG. 6) is associated with outer chamfer 202 to provide a smooth blend between the outer chamfer 202 and the adjacent race surface 301. The inner and outer radii ensure that there are no sharp edges between the chamfers 201/202 and adjacent surfaces, as sharp edges tend to cause damage to both the blade shank 101 and race 103.

Figure 4:
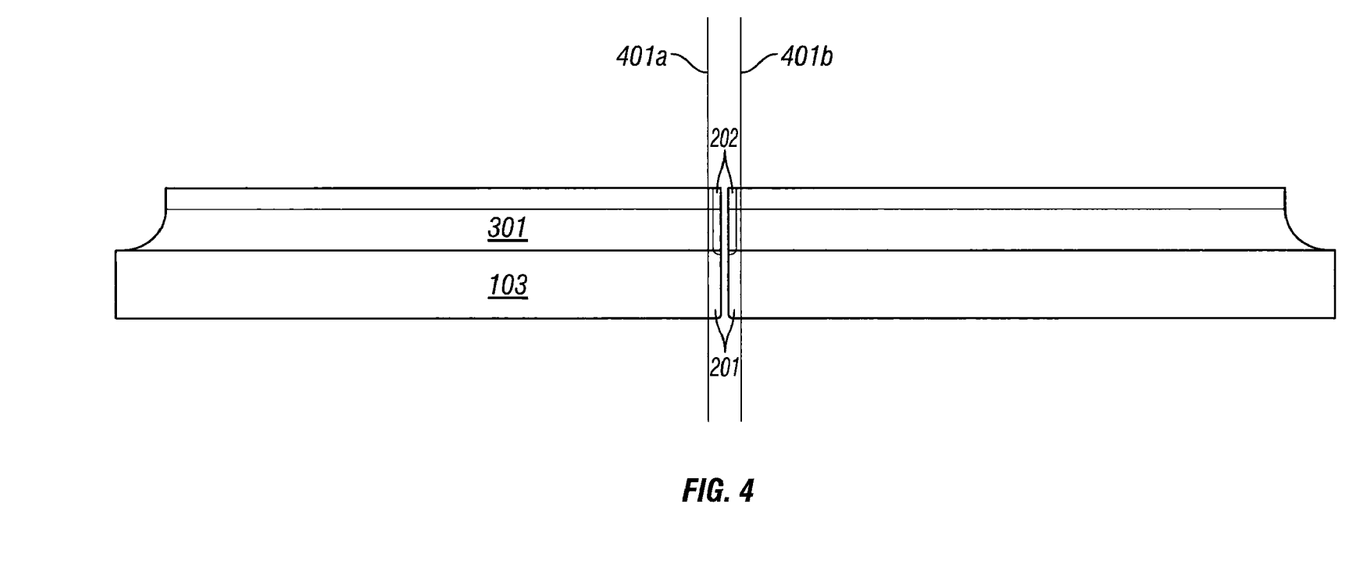
FIG. 4 illustrates a side view of an embodiment of a split blade retention race.

FIG. 4 shows a side view of a split blade retention race 103 at a split 104. The inner chamfers 201, outer chamfers 202, and race surface 301 are also shown. Load lines 401a-b, located at the edges of the outer radii associated with outer chamfers 202, show the points at which a ball bearing of ball bearings 102 is fully loaded on the race surface 301 of the split blade retention race 103. Between load lines 401a and 401b, the inner chamfers 201, outer chamfers 202, and radii ensure that a ball bearing unloads and becomes fully unloaded over the inner unsupported section of the race. The chamfers 201/202 are sized such that only one ball bearing of ball bearings 102 is unloaded at a time, and the outer chamfers 202 are larger than the inner chamfers 201.

Figure 5:
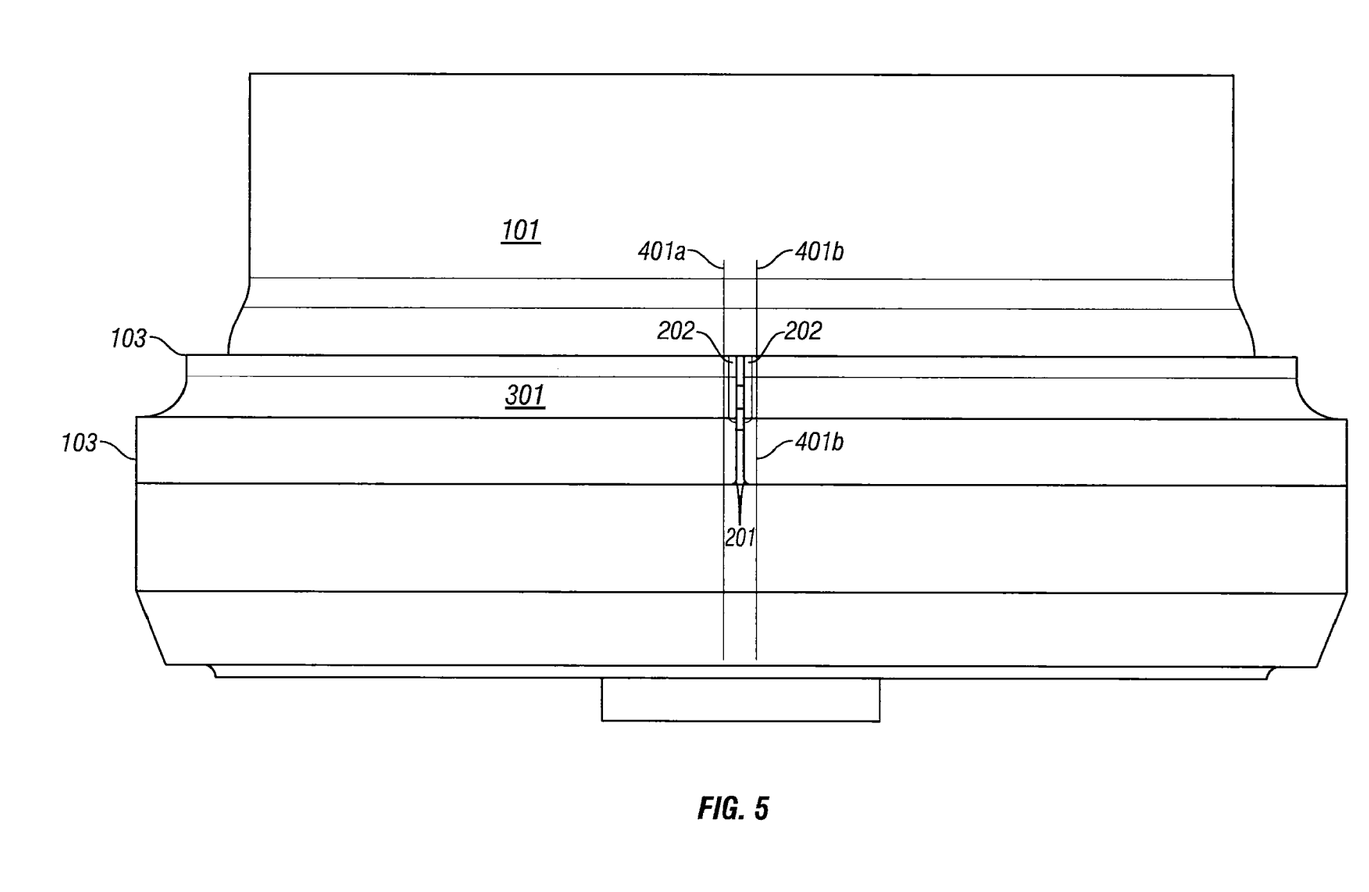
FIG. 5 illustrates a side view of an embodiment of a split blade retention race on a blade shank.

FIG. 5 shows a side view of a blade shank 101 with a split blade retention race 103 at a split 104. Inner chamfers 201 and outer chamfers 202 are located on split blade retention race 103 at the edges of the split 104. Load lines 401a-b, located at the edges of the outer radii associated with outer chamfers 202, show the point at which a ball bearing is fully loaded on the race surface 301 of the split blade retention race 103. As a ball passes between load lines 401a and 401b, the ball bearing becomes unloaded on either split blade retention race 103 due to the presence of outer chamfers 202 and associated outer radii, preventing loading of the unsupported section of the split blade retention race 103. Inner chamfers 201 and associated radii are located on the side of the split blade retention race 103 that is adjacent to the blade shank 101.

Figure 6:
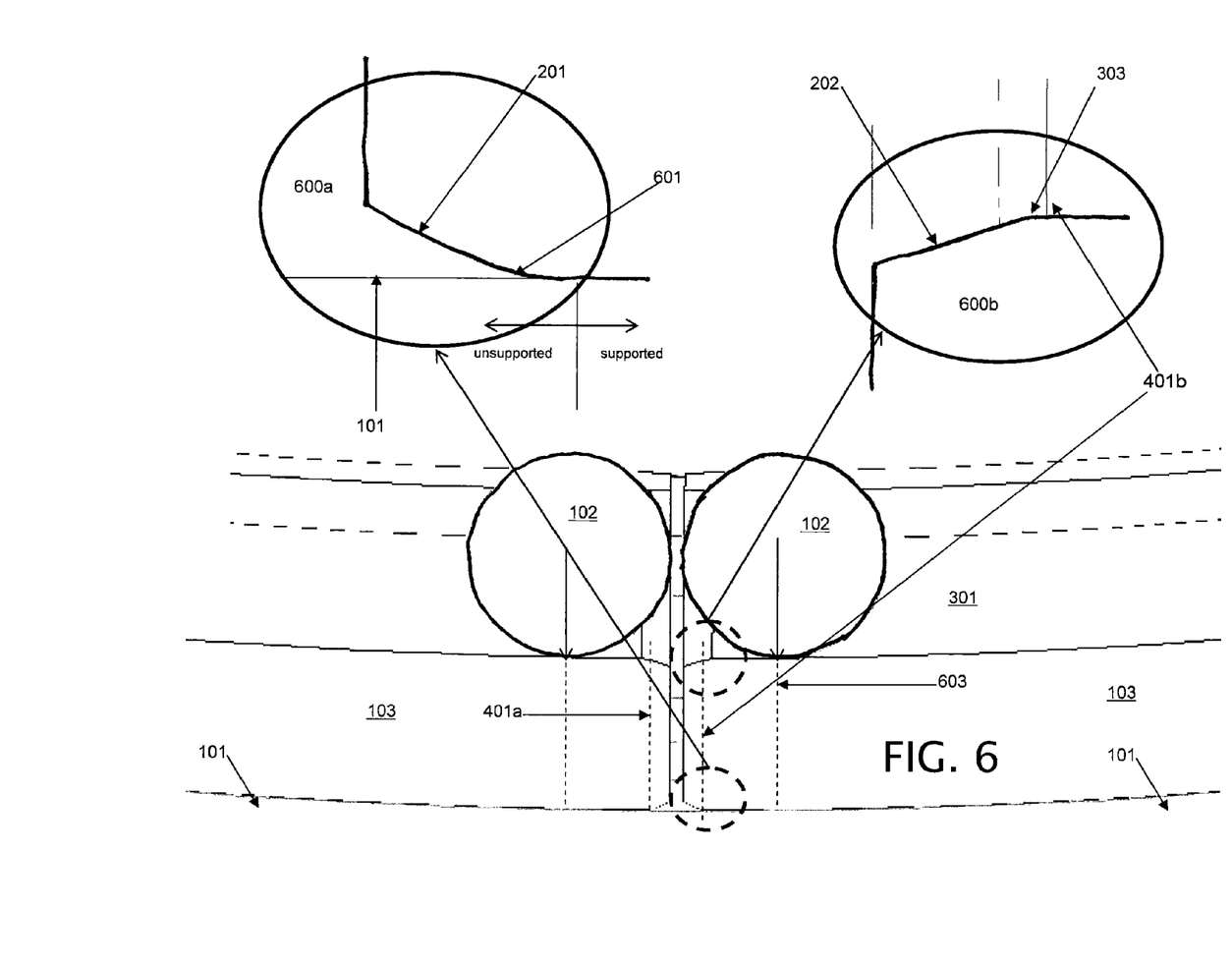
FIG. 6 illustrates a detailed view of an embodiment of inner and outer chamfers and associated inner and outer radii.
Figure 7:
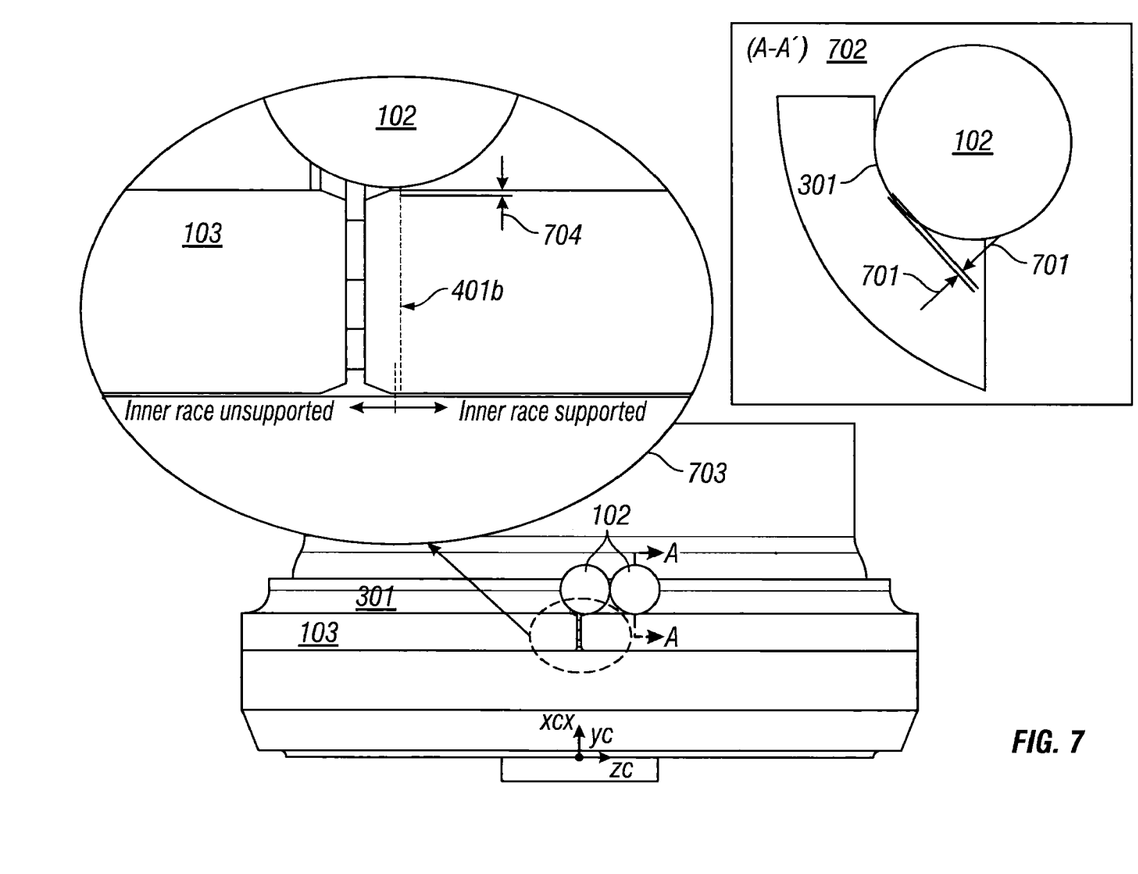
FIG. 7 illustrates a detailed view of a compressive deflection of a ball on a race surface.

FIG. 6 illustrates a detailed view of an embodiment of inner and outer chamfers and associated inner and outer radii. Split blade retention race 103, with race surface 301 and ball bearings 102 located on race surface 301, is shown; the split blade retention race 103 is located on blade shank 101. Detailed view 600a shows an inner chamfer 201 and associated inner radius 601. Inner chamfer 201 is a straight surface, and inner radius 601 is a curved surface joining the inner chamfer 201 to the surface of split blade retention race 103 that is adjacent to blade shank 101. The curve of radius 601 prevents damage to the blade shank 101. Detailed view 600b shows an outer chamfer 202 and associated outer radius 303. Outer chamfer 202 is a straight surface, and outer radius 303 is a curved surface joining the outer chamfer 202 to the race surface 301, ensuring a smooth transition for the ball bearings 102 as the ball bearings 102 pass over the outer chamfers 202 and outer radii 303. Load lines 401a-b are located on the outer edges of the outer radii 303. Line 603 illustrates the center load line 603 of a ball bearing 102. When the center load line 603 of a ball bearing 102 is between load lines 401a-b, the ball bearing starts to unload then becomes fully unloaded when the depth below the race surface 301 equals the compressive deflection of the ball bearing 102. This is shown in further detail with respect to FIG. 7. The compressive deflection 701 of a ball 102 is shown with respect to cross-section 702 along line A-A'. In detailed view 703 of FIG. 7, when depth below the race surface 301 (on radius or chamfer), indicated by lines 704, equals the compressive deflection 702 of the ball bearing 102, ball bearing 102 is fully unloaded.

The technical effects and benefits of exemplary embodiments include reduction of blade shank damage due to blade race split configuration as well as reduction in wear in the split race edges.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A blade shank assembly for an aircraft propeller blade, comprising:
   a blade shank;
   a split blade retention race encircling the blade shank, the split blade retention race including two splits, wherein the split blade retention race comprises:
   inner chamfers located between the blade shank and the split blade retention race at each of the two splits; and
   outer chamfers located adjacent to a race surface of the split blade retention race at each of the two splits; and
   a plurality of ball bearings located on the race surface of the split blade retention race.

2. The blade shank assembly of claim 1, wherein an inner chamfer comprises a straight surface that is angled back along an interface between a surface of the split blade retention race that is located inside of a split and a surface of the split blade retention race that is adjacent to the blade shank.

3. The blade shank assembly of claim 2, further comprising an inner radius comprising a curved surface that is located between the inner chamfer and the surface of the split blade retention race that is adjacent to the blade shank.

4. The blade shank assembly of claim 1, wherein an outer chamfer comprises a straight surface that is angled back along an interface between a surface of the split blade retention race that is located inside of a split and the race surface of the split blade retention race.

5. The blade shank assembly of claim 4, further comprising an outer radius comprising a curved surface that is located between the outer chamfer and the race surface of the split blade retention race.

6. The blade shank assembly of claim 5, wherein a ball bearing of the plurality of ball bearings is fully unloaded when a center load line of the ball bearing is located on one of an outer radius, a outer chamfer, or a split.

7. The blade shank assembly of claim 1, wherein only one ball bearing of the plurality of ball bearings is unloaded at a time.

8. The blade shank assembly of claim 1, wherein the outer chamfers are larger than the inner chamfers.

9. A split blade retention race for a blade shank assembly for an aircraft propeller blade, comprising:
 a race surface, the race surface configured to hold a plurality of ball bearings;
 a split surface, the split surface being configured to be located inside of split separating a first section of the split blade retention race from a second section of the split blade retention race;
 an inner surface, the inner surface being configured to be located adjacent to a blade shank in the blade shank assembly;
 an inner chamfer, wherein the inner chamfer is angled back along an interface between the split surface to the inner surface; and
 an outer chamfer, wherein the outer chamfer is angled back along an interface between the split surface and the race surface.

10. The split blade retention race of claim 9, wherein the inner chamfer comprises a straight surface, and further comprising an inner radius comprising a curved surface that is located between the inner chamfer and the inner surface of the split blade retention race.

11. The split blade retention race of claim 9, wherein the outer chamfer comprises a straight surface, and further comprising an outer radius comprising a curved surface that is located between the outer chamfer and the race surface of the split blade retention race.

12. The split blade retention race of claim 9, wherein the outer chamfers are larger than the inner chamfers.

13. The split blade retention race of claim 9, wherein only one ball bearing of the plurality of ball bearings held on the race surface is unloaded at a time.

* * * * *